(12) United States Patent
Yoshikawa et al.

(10) Patent No.: US 10,132,613 B2
(45) Date of Patent: Nov. 20, 2018

(54) INFORMATION PROCESSING APPARATUS, METHOD FOR CONTROLLING INFORMATION PROCESSING APPARATUS, GRIPPING SYSTEM, AND STORAGE MEDIUM

(71) Applicant: CANON KABUSHIKI KAISHA, Tokyo (JP)

(72) Inventors: Hiroshi Yoshikawa, Kawasaki (JP); Shinji Uchiyama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 351 days.

(21) Appl. No.: 14/666,824

(22) Filed: Mar. 24, 2015

(65) Prior Publication Data

US 2015/0276383 A1    Oct. 1, 2015

(30) Foreign Application Priority Data

Mar. 31, 2014    (JP) .................... 2014-073733

(51) Int. Cl.
    G01B 11/14    (2006.01)
    G01S 17/08    (2006.01)
    (Continued)

(52) U.S. Cl.
    CPC .............. *G01B 11/14* (2013.01); *G01S 17/08* (2013.01); *G01S 17/46* (2013.01); *G01S 17/89* (2013.01);
    (Continued)

(58) Field of Classification Search
None
See application file for complete search history.

(56) References Cited

U.S. PATENT DOCUMENTS 5,727,093 A    3/1998   Uchiyama et al.
5,969,725 A    10/1999  Fujiki et al.
(Continued)

FOREIGN PATENT DOCUMENTS

EP    2065678 B1    2/2016
JP    3800842 B2    7/2006
(Continued)

OTHER PUBLICATIONS

Office Action issued in German Patent Application No. 102015104732.2 dated Jan. 29, 2016.
(Continued)

*Primary Examiner* — Eileen M Adams
(74) *Attorney, Agent, or Firm* — Fitzpatrick, Cella, Harper & Scinto

(57) ABSTRACT

An information processing apparatus comprises: an image acquisition unit that acquires a captured image of a target object onto which a pattern is projected; a distance acquisition unit that acquires, based on the image, a plurality of distance values, each indicating a distance to the target object; a determination unit that determines whether each of the acquired distance values is noise generated by multiple reflection of the pattern; a first processing unit that performs first processing, using distance values obtained by removing a distance value that is determined to be the noise from the plurality of distance values; and a second processing unit that performs second processing, using the plurality of distance values that are acquired by the distance acquisition unit and from which the distance value determined to be the noise has not been removed.

28 Claims, 14 Drawing Sheets

(51) Int. Cl.
*G01S 17/46* (2006.01)
*G01S 17/89* (2006.01)

(52) U.S. Cl.
CPC ............ *Y10S 901/02* (2013.01); *Y10S 901/31* (2013.01); *Y10S 901/47* (2013.01)

(56) References Cited

U.S. PATENT DOCUMENTS

| | | | |
|---|---|---|---|
| 6,151,028 | A | 11/2000 | Kumagai et al. |
| 6,400,362 | B1 | 6/2002 | Uchiyama et al. |
| 7,613,356 | B2 | 11/2009 | Uchiyama et al. |
| 8,711,214 | B2 | 4/2014 | Fujiki |
| 8,938,099 | B2 | 1/2015 | Yoshikawa |
| 9,050,722 | B2 | 6/2015 | Satou |
| 2009/0201292 | A1 | 8/2009 | Abe et al. |
| 2011/0052049 | A1* | 3/2011 | Rajaraman ........... G06Q 10/087 382/165 |
| 2011/0211066 | A1 | 9/2011 | Fujiki |
| 2012/0154577 | A1 | 6/2012 | Yoshikawa |
| 2012/0263353 | A1* | 10/2012 | Kitajima ............... G01S 7/4802 382/106 |
| 2013/0010070 | A1 | 1/2013 | Tateno et al. |
| 2013/0238125 | A1 | 9/2013 | Suzuki |
| 2014/0071459 | A1* | 3/2014 | Nakatsukasa ........... G01B 11/25 356/611 |
| 2014/0074288 | A1* | 3/2014 | Satou ..................... B25J 9/1679 700/253 |
| 2014/0078490 | A1 | 3/2014 | Higo et al. |
| 2014/0118539 | A1 | 5/2014 | Ota et al. |
| 2014/0247395 | A1* | 9/2014 | Van Belle ............. G06T 11/001 348/622 |
| 2015/0116582 | A1 | 4/2015 | Yoshikawa et al. |

FOREIGN PATENT DOCUMENTS

| | | |
|---|---|---|
| JP | 2007-221491 A | 8/2007 |
| JP | 2009-145175 A | 7/2009 |
| JP | 2011-179910 A | 9/2011 |
| JP | 2012-141964 A | 7/2012 |
| JP | 2014-054715 A | 3/2014 |

OTHER PUBLICATIONS

Jan. 29, 2018 Japanese Official Action in Japanese Patent Appln. No. 2014-073733.
Feb. 21, 2018 German Official Action in German Patent Appln. No. 102015104732.2.

* cited by examiner

F I G. 7A
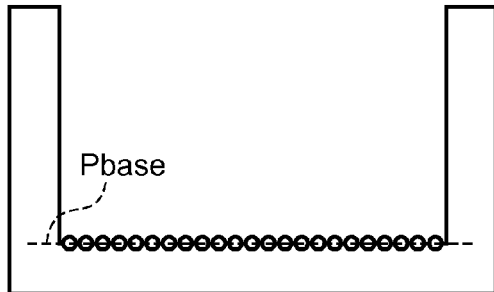
F I G. 7B
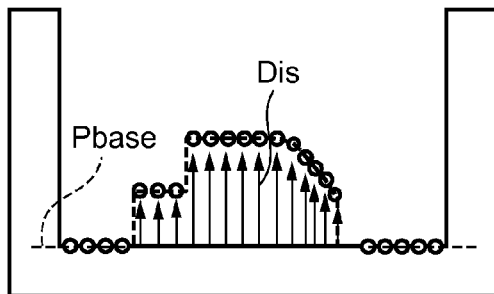
F I G. 7C
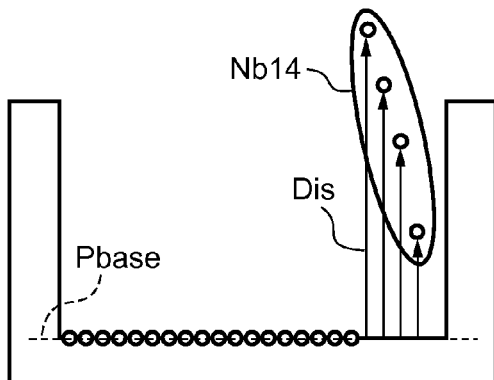

STATE WHERE MEASUREMENT TARGET EXISTS
MULTIPLE REFLECTION NOISE REMOVAL
HAS NOT BEEN PERFORMED

STATE WHERE INSIDE OF PALLET IS EMPTY
MULTIPLE REFLECTION NOISE REMOVAL
HAS BEEN PERFORMED

STATE WHERE MEASUREMENT TARGET EXISTS
MULTIPLE REFLECTION NOISE REMOVAL
HAS BEEN PERFORMED

MODEL DATA

MEASUREMENT POINTS

FITTING (INITIAL STAGE)

FITTING (FINAL)

FITTING TO MEASUREMENT POINTS FROM WHICH NOISE HAS BEEN REMOVED

FITTING IN THE CASE WHERE MULTIPLE REFLECTION NOISE EXISTS

NO INTERFERENCE
NO MULTIPLE REFLECTION

INTERFERENCE HAS OCCURRED
NO MULTIPLE REFLECTION

NO INTERFERENCE
MULTIPLE REFLECTION NOISE REMOVAL
HAS NOT BEEN PERFORMED

F I G. 11D
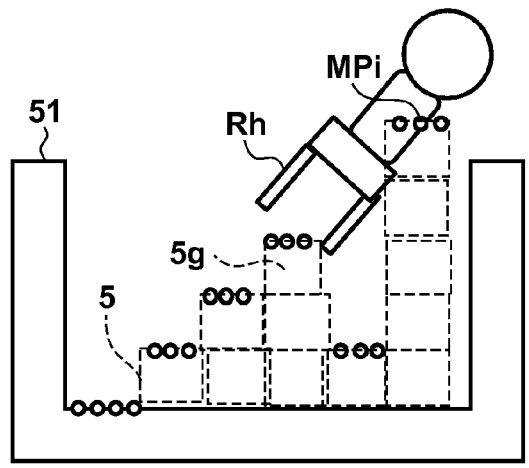
INTERFERENCE HAS OCCURRED
MULTIPLE REFLECTION NOISE REMOVAL
HAS NOT BEEN PERFORMED
F I G. 11E
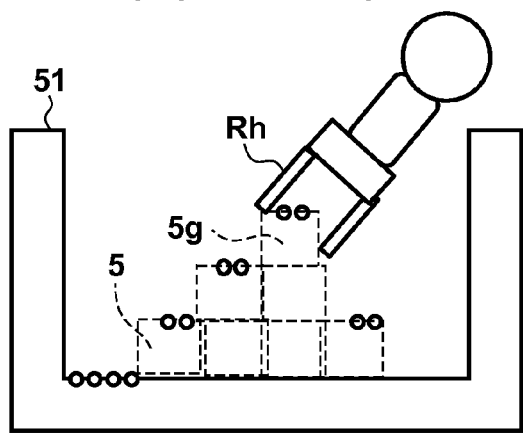
NO INTERFERENCE
MULTIPLE REFLECTION NOISE
HAS BEEN PERFORMED
F I G. 11F
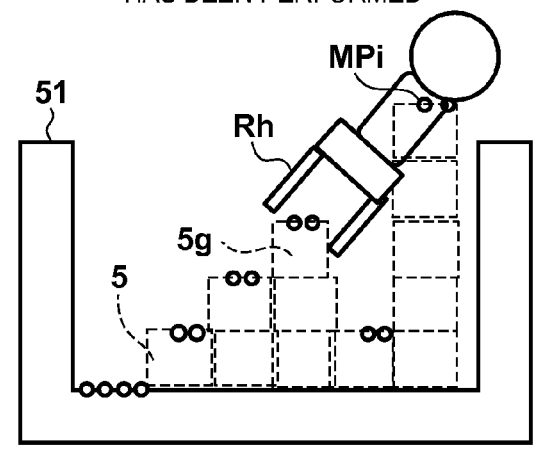
INTERFERENCE HAS OCCURRED
MULTIPLE REFLECTION NOISE REMOVAL
HAS NOT BEEN PERFORMED

INFORMATION PROCESSING APPARATUS, METHOD FOR CONTROLLING INFORMATION PROCESSING APPARATUS, GRIPPING SYSTEM, AND STORAGE MEDIUM

BACKGROUND OF THE INVENTION

Field of the Invention

The present invention relates to an information processing apparatus, a method for controlling an information processing apparatus, a gripping system, and a storage medium.

Description of the Related Art

When image capturing target objects have high glossiness, and faces of the image capturing target objects are arranged so as to form a reentrant angle, multiple times of light reflection, i.e., multiple reflection, is likely to occur between the image capturing target objects. Multiple reflection is also called mutual reflection, since the reflection mutually occurs between the image capturing target objects. If multiple reflection occurs, objects that face each other are unexpectedly reflected in the image capturing target objects in a captured image. If usual image processing is applied in a state where the unexpected reflection occurs, the portion of the unexpected reflection is affected by the other area.

In particular, unexpected reflection has significant influence in an active distance measurement device that uses one-dimensional line light projection or two-dimensional pattern light projection and measures the distance to an image capturing target object.

With the active distance measurement device, the distance is measured using the principle of triangulation, based on the direction in which projected light exits from an illuminating device and the direction in which the projected light enters an image capturing device after being reflected at the image capturing target object.

When an image capturing target object has a high surface scattering property, a large part of the light entering the image capturing device from the image capturing target object is primary reflected light, and accordingly the distance measurement using the principle of triangulation effectively works. However, if the aforementioned unexpected reflection occurs due to multiple reflection, the incident direction of the projected light will be incorrectly recognized, and an error occurs in the measured distance, resulting in noise generation.

Japanese Patent Laid-Open No. 2009-145175 discloses a method by which noise is removed using the characteristics of the way noise is generated due to multiple reflection. With this method, it is determined that noise has been generated and the noise is then removed if the angle formed between a face that directly faces the distance measurement device and the direction of a vector connecting the measurement point of interest and an adjacent measurement point is large. This method uses a characteristic that the noise generated by multiple reflection is likely to have a steep characteristic with respect to the face that directly faces the distance measurement device.

Japanese Patent No. 3800842 discloses a method by which noise is removed using a characteristic that an image is inverted due to reflection occurring an even number of times. With this method, the increasing and decreasing direction of spatial codes on a captured image obtained with pattern light projected from a projection device is determined in advance, and it is determined that multiple reflection has occurred, if the increasing and decreasing direction of the spatial codes is opposite to the determined increasing and decreasing direction of the codes. This method uses the characteristic that an image is inverted due to reflection occurring an even number of times, and the fact that a dominant component of multiple reflected light is a secondary reflected light component.

However, with the method described in Japanese Patent Laid-Open No. 2009-145175, a noise point generated by multiple reflection can be effectively removed, but meanwhile, there are cases where a measurement point that is not noise is incorrectly determined to be noise and is removed, since a relationship between a measurement point of interest and an adjacent measurement point is also steep near a step between objects.

Similarly, with the method described in Japanese Patent No. 3800842, a noise point generated by multiple reflection occurring an even number of times can be favorably removed, but meanwhile, there are cases where the increasing and decreasing direction of the spatial codes also becomes opposite near a step between objects, and accordingly, a nearby measurement point is removed, and a lack of information regarding the measurement point near the step affects the accuracy in some cases.

The present invention has been made in view of the foregoing problem, and provides a technique for reducing both the influence of noise generated by multiple reflection and the influence of a side effect of noise removal processing on information processing that uses measured distance values.

SUMMARY OF THE INVENTION

According to one aspect of the present invention, there is provided an information processing apparatus comprising: an image acquisition unit configured to acquire a captured image of a target object onto which a pattern is projected; a distance acquisition unit configured to acquire, based on the image, a plurality of distance values, each indicating a distance to the target object; a determination unit configured to determine whether each of the acquired distance values is noise generated by multiple reflection of the pattern; a first processing unit configured to perform first processing, using distance values obtained by removing a distance value that is determined to be the noise from the plurality of distance values; and a second processing unit configured to perform second processing that is different from the first processing, using the plurality of distance values that are acquired by the distance acquisition unit and from which the distance value determined to be the noise has not been removed.

Further features of the present invention will become apparent from the following description of exemplary embodiments with reference to the attached drawings.

BRIEF DESCRIPTION OF THE DRAWINGS

FIGS. 7A to 7F are diagrams illustrating pallet emptiness determination processing.

FIGS. 11A to 11F are diagrams illustrating interference determination processing.

DESCRIPTION OF THE EMBODIMENTS

Figure 1:
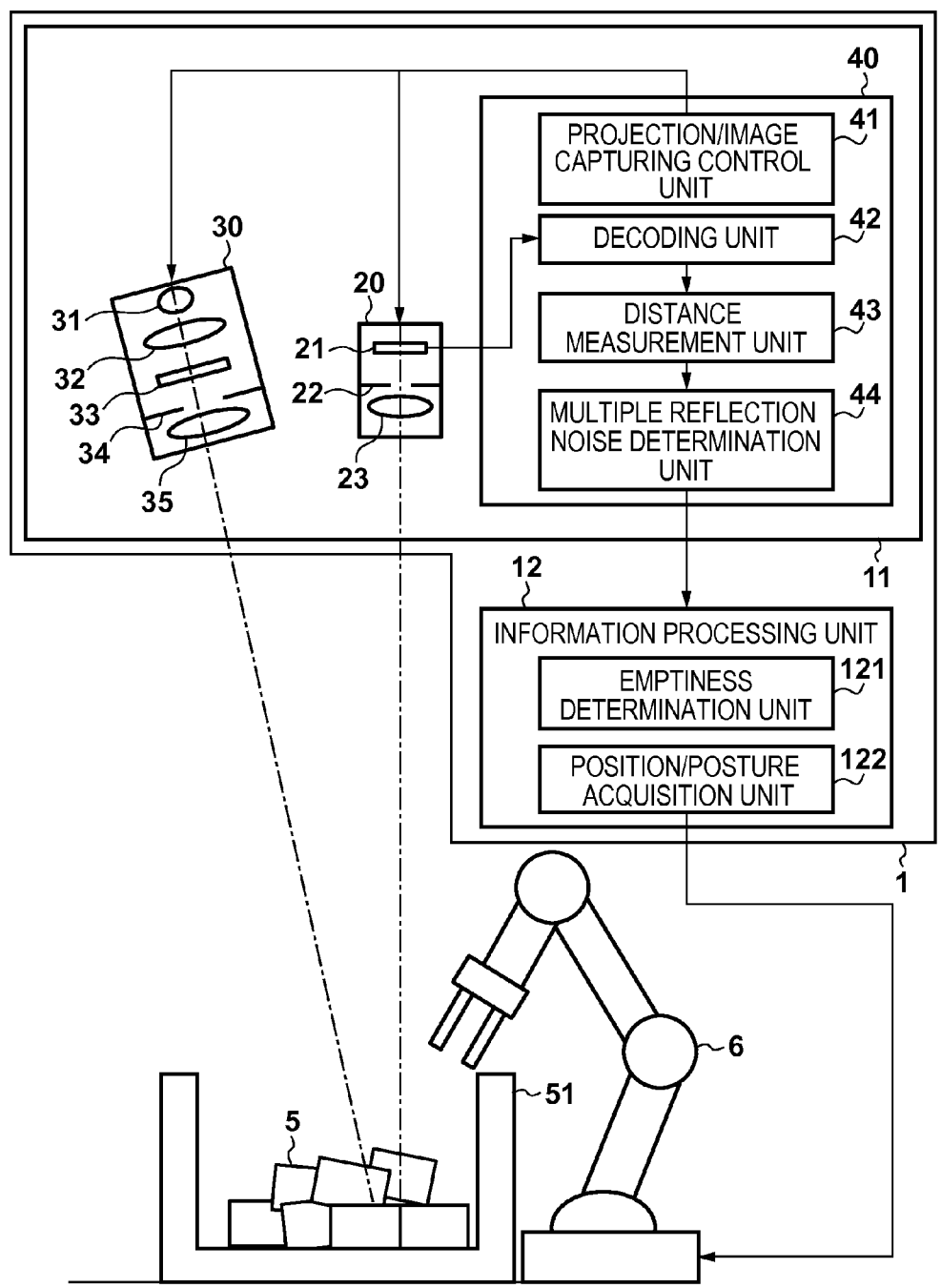
FIG. 1 is a schematic configuration diagram of a robot system including an information processing apparatus according to Embodiment 1.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The present embodiment will describe an example in which processing is switched between the case of performing downstream processing after removing multiple reflection noise from measured distance values and the case of performing downstream processing without removing multiple reflection noise from measured distance values, depending on the type of the downstream processing, thereby reducing both the influence of noise generated by multiple reflection and the influence of a side effect caused by noise removing processing. As types of the downstream processing, first processing in which noise is removed (processing for determining the presence of a target object, the processing being susceptible to the influence of noise) and second processing in which noise is not removed (model fitting processing that is relatively not susceptible to the influence of noise) will be described.

Firstly, an exemplary functional configuration of an information processing apparatus 1 according to the present embodiment will be described using a block diagram in FIG. 1. The information processing apparatus 1 has a distance measurement device 11 that measures the distances to a measurement target object 5 and to a pallet 51 in which the measurement target object 5 is stored, and an information processing unit 12 that performs information processing using distance values obtained by the distance measurement device 11. The information processing unit 12 is connected to a robot 6 that grips the measurement target object 5, and can control the robot 6 based on an information processing result. For example, the information processing unit 12 can be applied to a gripping system for recognizing the position and posture of the measurement target object 5 and controlling the robot 6 to pick up the measurement target object 5, based on the distance values of the measurement target object 5 and model data.

The distance measurement device 11 has a projection unit 30 that projects pattern light to the measurement target object 5, an image capturing unit 20 that captures an image of the measurement target object 5 onto which the pattern light is projected, and an image processing unit 40 that controls the projection unit 30 and the image capturing unit 20 and measures the distance to the measurement target object 5 based on a space coding method.

Firstly, the projection unit 30 will be described. As shown in FIG. 1, the projection unit 30 includes a light source 31, an illumination optical system 32, a display element 33, a projection diaphragm 34, and a projection optical system 35.

The light source 31 is any kind of light-emitting device, such as a halogen lamp or an LED (Light Emitting Diode). The illumination optical system 32 is an optical system having a function of guiding the light radiated from the light source 31 toward the display element 33, and for example, an optical system suitable for equalizing the luminance, such as Koehler illumination or a diffuser panel, is used. The display element 33 is an element having a function of spatially controlling the transmittance or the reflectance of the light from the illumination optical system 32 in accordance with a supplied pattern, and for example, a transmission LCD (Liquid Crystal Display), a reflection LCOS (Liquid Crystal on Silicon), a DMD (Digital Micromirror Device), or the like is used. Regarding the supply of a pattern to the display element 33, a plurality of types of pattern that are held in the projection unit 30 may be sequentially supplied to the display element 33, or a plurality of types of pattern held in an external device (e.g., image processing unit 40) may be sequentially acquired and supplied to the display element 33. The projection optical system 35 is an optical system configured to cause the light (pattern light) guided from the display element 33 to form an image at a specific position on the measurement target object 5. The projection diaphragm 34 is used for controlling the F number of the projection optical system 35. The F number is a value obtained by dividing the focal length of a lens by an effective aperture, and is an index indicating the brightness of the lens. The smaller the F value is, the brighter the lens is (i.e., the larger the amount of light that passes through the lens is), and the faster the shutter speed can be set.

Next, the image capturing unit 20 will be described. As shown in FIG. 1, the image capturing unit 20 includes an image capturing optical system 23, an image capturing diaphragm 22, and an image sensor 21. The image capturing optical system 23 is an optical system configured to form, on the image sensor 21, an image of a specific position on the measurement target object 5. The image capturing diaphragm 22 is used for controlling the F number of the image capturing optical system 23. The image sensor 21 is any kind of photoelectric conversion element, such as a CMOS (Complementary Metal-Oxide Semiconductor) sensor or a CCD (Charge Coupled Device) sensor. Note that an analog signal that has been generated by photoelectric conversion by the image sensor 21 is sampled and quantized by a control unit (not shown) in the image capturing unit 20, and is converted into a digital image signal. Furthermore, this control unit generates an image (captured image), each pixel of which has a luminance gradation value (density value, pixel value), from this digital image signal, and sends this captured image to a memory in the image capturing unit 20 and the image processing unit 40 as appropriate.

Next, the image processing unit 40 will be described. As shown in FIG. 1, the image processing unit 40 includes a projection/image capturing control unit 41, a decoding unit 42, a distance measurement unit 43, and a multiple reflection noise determination unit 44.

The projection/image capturing control unit 41 controls the image capturing unit 20 so as to capture an image of the measurement target object 5 every time the type of pattern light supplied by the projection unit 30 is switched. That is to say, the image capturing unit 20 and the projection unit 30 are controlled so as to operate synchronously with each other, and as a result, the image capturing unit 20 can capture images of the measurement target object 5 onto which different types of pattern light are projected. The projection/image capturing control unit 41 starts to operate based on an instruction from the robot 6.

The decoding unit 42 decodes, based on the captured images of the plurality of types of pattern light captured by the image capturing unit 20, a spatial code at each position on the captured images.

The distance measurement unit 43 measures the distance from the image capturing unit 20 (image capturing optical system 23) to the measurement target object 5, based on the principle of triangulation, using the spatial codes decoded by the decoding unit 42 and the position on the captured images.

The multiple reflection noise determination unit 44 determines multiple reflection noise, based on the distance values calculated by the distance measurement unit 43.

The information processing unit 12 performs information processing, using distance information that is output from the distance measurement device 11. The information processing unit 12 includes an emptiness determination unit 121 and a position/posture acquisition unit 122. The emptiness determination unit 121 determines whether or not any measurement target object 5 remains in the pallet 51. The position/posture acquisition unit 122 calculates the position and posture of the measurement target object 5 based on information of a distance point group of the measurement target object 5 and CAD model information of the measurement target object 5.

Figure 2:
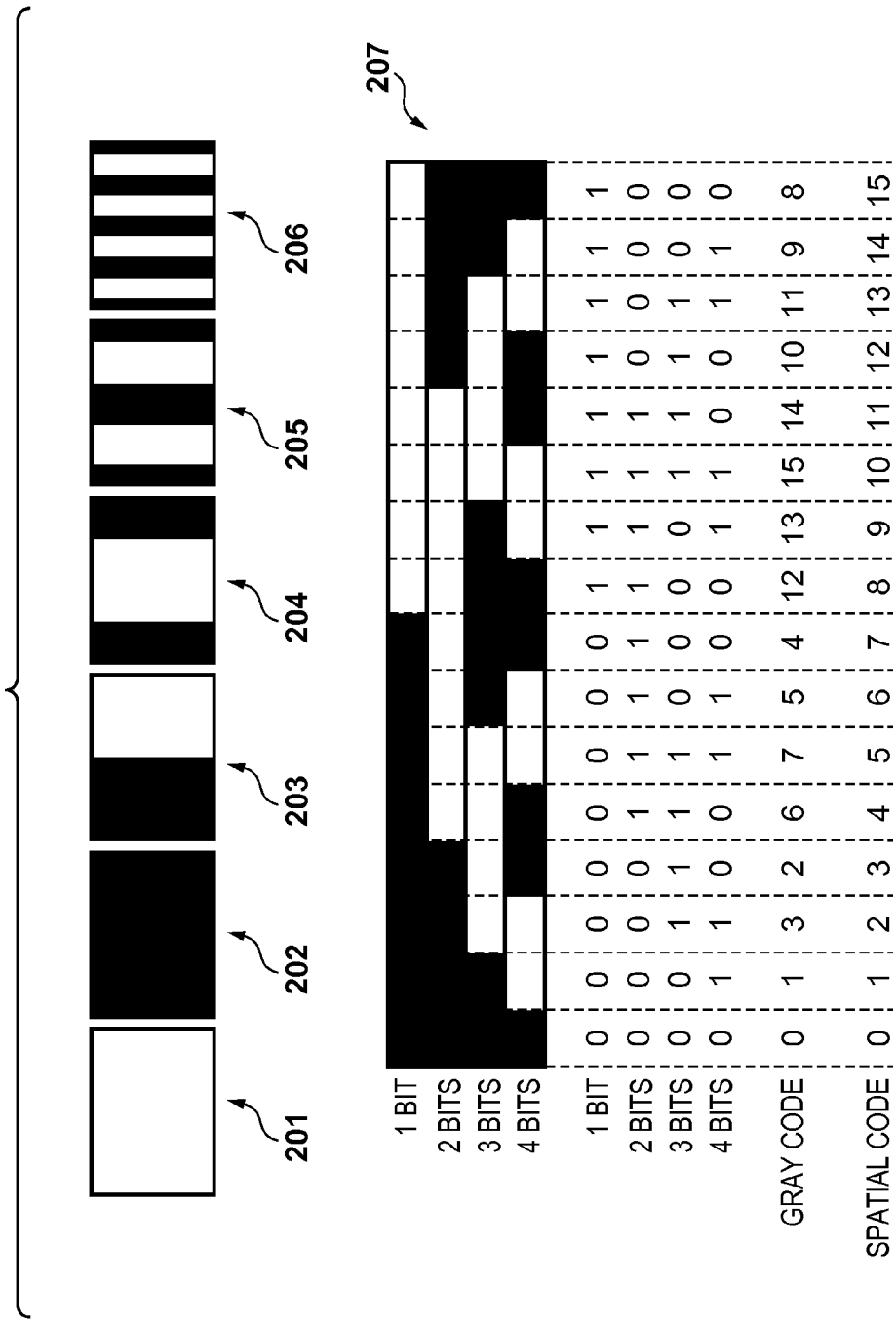
FIG. 2 is a diagram illustrating projection patterns (4 bits) and Gray codes in a space coding method.

In Embodiment 1, for example, space coding pattern images denoted by reference numerals 201 to 206 in FIG. 2 are projected by the projection unit 30. These are projection patterns in a 4-bit space coding method. Reference numeral 201 denotes a fully-lighted pattern, and reference numeral 202 denotes a fully-unlighted pattern. Reference numeral 203 denotes a 1-bit positive pattern, reference numeral 204 denotes a 2-bit positive pattern, reference numeral 205 denotes a 3-bit positive pattern, and reference numeral 206 denotes a 4-bit positive pattern. Binarization determination is performed using captured images of the space coding patterns of the respective bits denoted by reference numerals 203 to 206. In the binarization determination, specifically, a bright pattern portion and a dark pattern portion are determined to be 1 and 0, respectively. A threshold of the binarization determination may be an average value of image luminance values of the captured image of the fully-lighted pattern denoted by reference numeral 201 and the captured image of the fully-unlighted pattern denoted by reference numeral 202, for example.

Upon the binarization determination being performed, Gray codes are obtained with respect to respective pixels of the captured images, as denoted by reference numeral 207. Reference numeral 207 denotes 4-bit Gray codes. After the Gray codes are obtained, the Gray codes can be uniquely converted into spatial codes.

Figure 3:
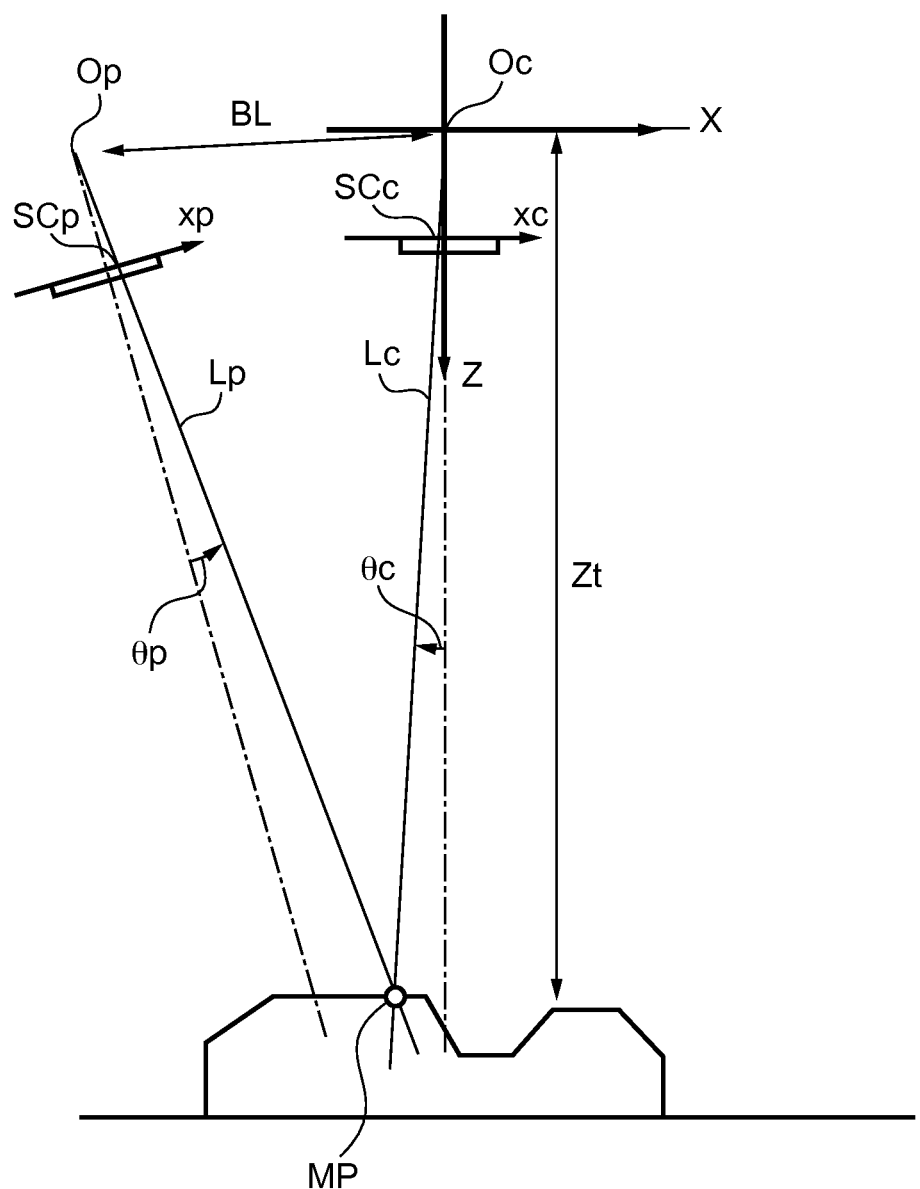
FIG. 3 is a diagram illustrating the principle of distance measurement based on triangulation.

FIG. 3 is a diagram illustrating the principle of distance measurement based on triangulation. Sign Op denotes a projection unit principal point position, and Sign Oc denotes an image capturing unit principal point position. Upon a spatial code SCp in image coordinates xp of the projection unit 30 being uniquely determined, a line Lp connecting the projection unit principal point position Op and the spatial code SCp can be drawn, and accordingly the exit direction θp is uniquely fixed. Similarly, upon the position SCc of a spatial code in image coordinates xc of the image capturing unit 20 being uniquely determined, a line Lc connecting the image capturing unit principal point position Oc and the pixel position SCc of the spatial code can be drawn, and accordingly the incident direction θc is also uniquely fixed. An intersection point of the two lines Lp and Lc serves as a measurement point MP. As a result of understanding in advance a base line length BL, which is the distance between the principal points of the projection unit 30 and the image capturing unit 20, the distance Zt to a target object can be calculated based on the principle of triangulation.

Figure 4A:
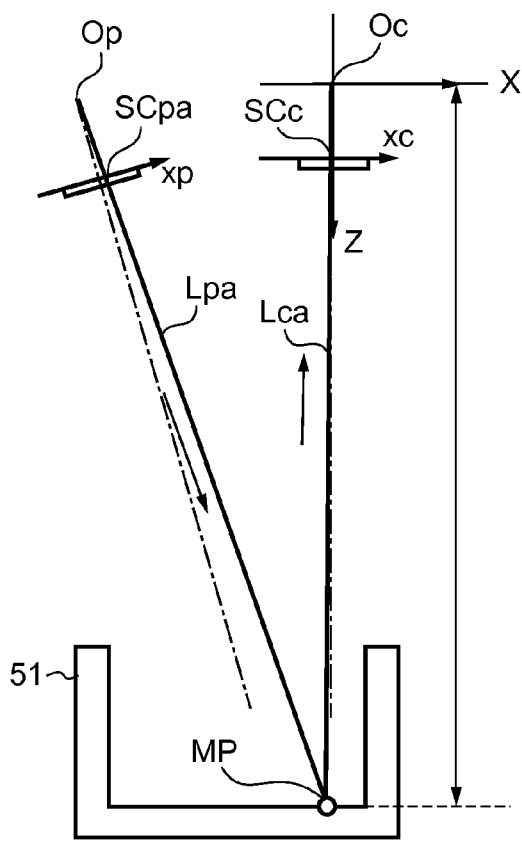
FIGS. 4A and 4B are diagrams illustrating the mechanism of noise generation due to multiple reflection.

Next, the mechanism of noise generation due to multiple reflection will be described with reference to FIGS. 4A and 4B. FIG. 4A is an illustrative diagram in the case where the influence of multiple reflection is small, and FIG. 4B is an illustrative diagram in the case where the influence of multiple reflection is large.

As shown in FIG. 4A, in the case where the influence of multiple reflection is small, a light beam Lpa whose exit direction from the projection unit 30 (Op) passes through SCpa and a light beam Lca whose incident direction toward the image capturing unit 20 (Oc) passes through SCc are used, and accordingly, the measurement point MP existing on the bottom face of the pallet 51 can be correctly triangulated.

Figure 4B:
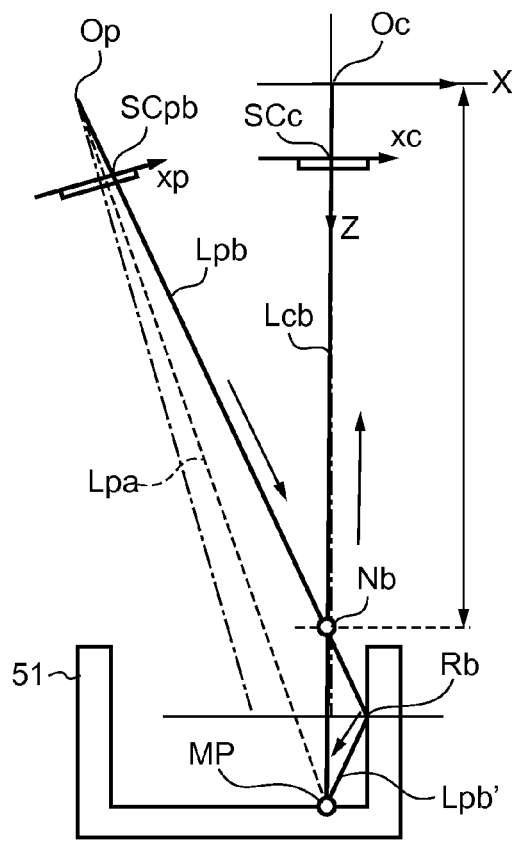

On the other hand, as shown in FIG. 4B, in the case where the influence of multiple reflection is large, the light that exits from the projection unit 30 in the exit direction SCpb is reflected once at a side face portion Rb of the pallet, and enters a bottom face portion MP of the pallet. If, as seen from the image capturing unit 20, the intensity of a light beam Lpb' resulting from the multiple reflected light is higher than that of the light beam Lpa which is direct light, the light is recognized as coming from Lpb. At this time, due to the principle of triangulation, an intersection point Nb of Lpb and Lcb is calculated as a measurement point, and accordingly a noise point (intersection point Nb) will be generated with respect to the original measurement point MP.

Although FIGS. 4A and 4B have described an example of multiple reflection at the pallet side face portion Rb, multiple reflection also occurs between measurement target objects 5 in the case where the measurement target objects 5 are complicatedly piled up. Multiple reflection also occurs within a single measurement target object in the case where a measurement target object 5 has a complicated shape, in particular, a recessed face.

The mechanism of noise generation due to multiple reflection is as described above.

Next, a description will be given, with reference to FIG. 5, of the principle for determination of whether multiple reflection noise is generated, based on a vector direction with respect to an adjacent measurement point.

Figure 5:
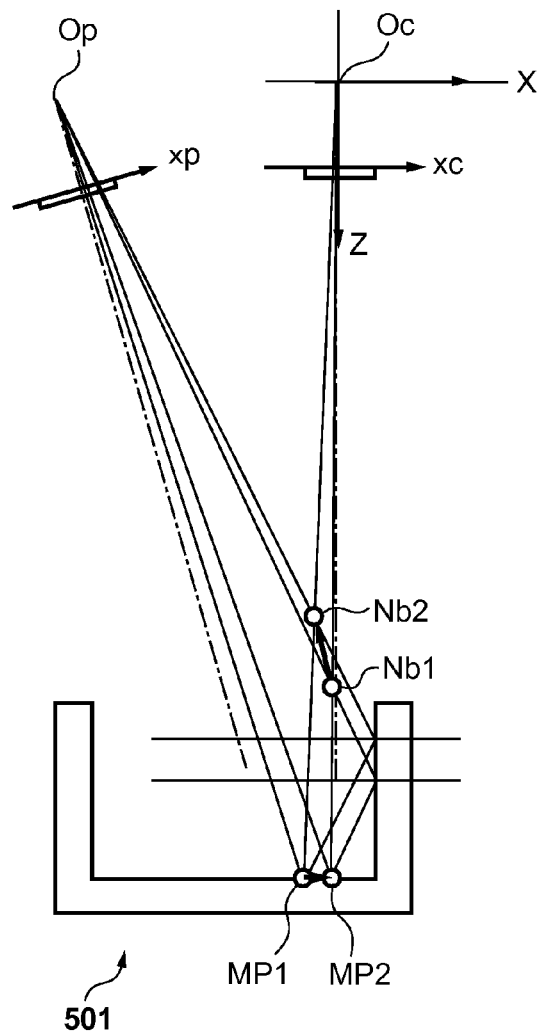
FIG. 5 is a diagram illustrating the principle of multiple reflection noise determination using a vector direction with respect to an adjacent measurement point.
Figure 5:

In the case where multiple reflection has not occurred, as denoted by reference numeral 501 in FIG. 5, a measurement point Mp1 and a measurement point MP2, which are adjacent to each other, exist on the pallet bottom face. At this time, the X coordinate axis of the image capturing unit and the pallet bottom face are in a substantially parallel relationship. For this reason, the angle φa formed by the X coordinate axis of the image capturing unit and the vector direction that connects the measurement point MP1 and the measurement point MP2 takes a small value, as denoted by reference numeral 502 in FIG. 5.

On the other hand, in the case where multiple reflection has occurred, a measurement point Nb1 and a measurement point Nb2, which are adjacent to each other, exist at positions other than on the pallet bottom face, as denoted by reference numeral 502. At this time, the angle φb formed by the X coordinate axis of the image capturing unit and the vector direction that connects the measurement point Nb1 and the measurement point Nb2 takes a large value, as denoted by reference numeral 503 in FIG. 5.

That is to say, it can be determined whether or not a measurement point derives from multiple reflection, based on whether the angle formed by the X coordinate axis of the image capturing unit and the vector with respect to an adjacent measurement point is large or small. Although the space in FIG. 5 is two-dimensionally expressed using the X axis and the Z axis for the sake of simplification, the actual space is three-dimensional, and accordingly the angle formed by an XY plane (reference plane) and a vector with respect to an adjacent measurement point is obtained. If the formed angle is larger than a threshold, it is determined that the measurement point is a noise point generated by multiple reflection. Empirically, it is favorable to set the threshold of the formed angle to about 60°. Although the present embodiment has described an example of comparison between the threshold and the angle formed with respect to the XY plane in a camera coordinate system, the determination may be performed by comparing the threshold with an angle formed with respect to the pallet bottom face, rather than the XY plane.

Figure 6A:
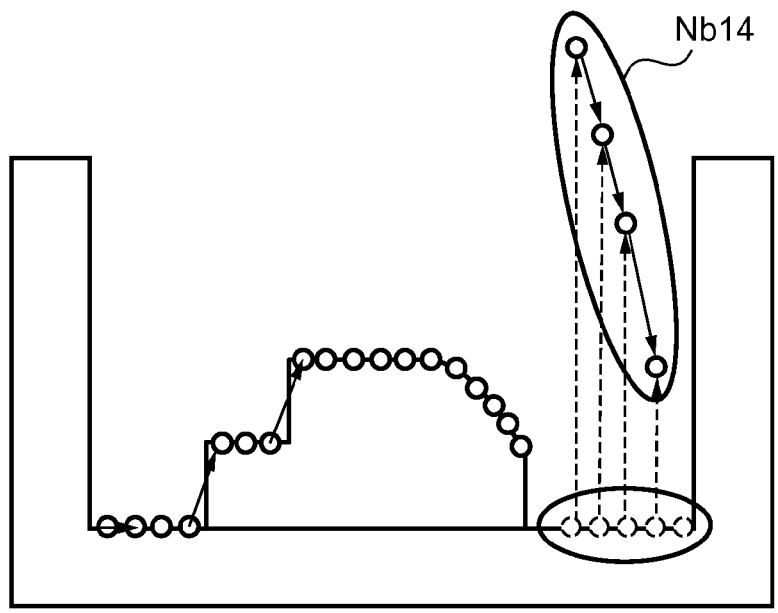
FIGS. 6A and 6B are diagrams illustrating a side effect of multiple reflection noise determination using a vector direction with respect to an adjacent measurement point.
Figure 6B:
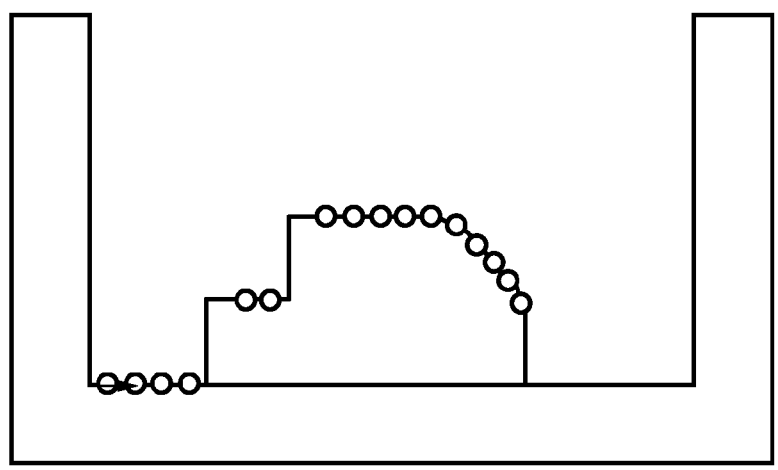

Next, a description will be given, with reference to FIGS. 6A and 6B, of a side effect of multiple reflection noise determination using the vector direction with respect to an adjacent measurement point. FIG. 6A expresses a distance point group before noise removal. FIG. 6B expresses a distance point group from which multiple reflection noise has been removed using the vector direction with respect to adjacent measurement points. The distance point group enclosed by Nb14 in FIG. 6A indicates noise points generated by multiple reflection at the pallet side face portion. Since the angles formed by the X-axis and the vector directions of the noise points generated by multiple reflection with respect to their adjacent points are large, the measurement points in this distance point group are removed as noise points. Meanwhile, in a step portion between objects as well, the angle formed by the X-axis and the vector direction with respect to an adjacent measurement point is large. For this reason, if multiple reflection noise removal processing is applied, a measurement point is also removed near the step.

For the emptiness determination unit 121 that determines whether or not measurement points exist as a mass within the pallet, the influence is small even if measurement points near the step are removed as noise. On the other hand, regarding target object position/posture calculation processing in which the position and posture of the measurement target object 5 are calculated based on information of the distance point group of the measurement target object 5 and the CAD model information of the measurement target object 5, there is a possibility of a decrease in the estimation accuracy due to the influence of data obtained near the step.

Pallet emptiness determination processing is processing for determining whether a measurement target object remains within the pallet (box) for storing measurement target objects or it does not remain (hereinafter expressed as "empty"). If the pallet is empty, a user of the information processing apparatus 1 is notified that the pallet is empty, and is prompted to replace the pallet, or to replenish measurement target objects into the pallet.

Figure 7D:
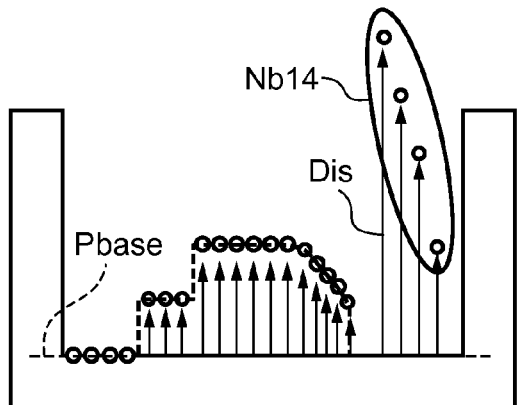

Now, FIGS. 7A to 7F are diagrams illustrating the pallet emptiness determination processing for determining the presence of a measurement target object. FIG. 7A expresses a state where the pallet is empty and multiple reflection noise does not exist. FIG. 7B expresses a state where a measurement target object exists within the pallet and multiple reflection noise does not exist.

In the pallet emptiness determination processing, the distance Dis between each measurement point and a face Pbase of the pallet on which an object is placed is obtained, and if the sum of the distances exceeds a threshold, it is determined that a measurement target object exists. If the sum of the distances does not exceed the threshold, it is determined that the pallet is empty. In an empty state as shown in FIG. 7A, the distance Dis between each measurement point and Pbase is almost 0. In the case where a measurement target object exists as shown in FIG. 7B, the value of the distance Dis is large in the area where the measurement target object is placed. The threshold of the sum of Dis for determining that the pallet is empty or that a measurement target object exists need only be determined based on information regarding the size of the measurement target object. For example, volume information can be used. If the threshold is appropriately set, the sum of Dis will not exceed the threshold in FIG. 7A, and it can be determined that the pallet is empty. On the other hand, in the case of FIG. 7B, the sum of Dis exceeds the threshold, and accordingly it is determined that a measurement target object exists.

Next, the influence in the case where multiple reflection noise exists will be described with reference to FIGS. 7C and 7D. FIG. 7C expresses a state where the pallet is empty but multiple reflection noise points Nb14 exist. In this case, even though a measurement target object does not exist, distances exist between the multiple reflection noise points Nb14 and Pbase, and it is accordingly determined that the distances are as denoted by Dis. If the sum of Dis exceeds the threshold, it will be determined that a measurement target object exists, even though no measurement target object exists. FIG. 7D expresses a state where a measurement target object and the multiple reflection noise points Nb14 exist. In this case, since the measurement target object itself also exists, the sum of Dis only becomes large, and a determination result will not be incorrect.

Figure 7E:
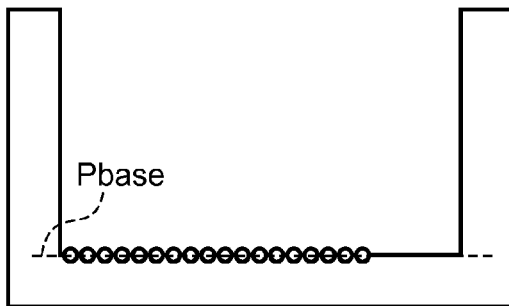

FIG. 7E expresses a result of removing the multiple reflection noise points Nb14 shown in FIG. 7C by performing the multiple reflection noise removal processing. Since the multiple reflection noise points Nb14 have been removed, the sum of the distances Dis that are generated between the respective measurement points and Pbase will not exceed the threshold, and it can be appropriately determined that the pallet is empty.

Figure 7F:
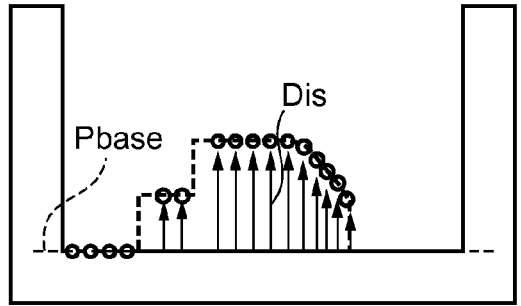

Furthermore, FIG. 7F shows a state where the multiple reflection noise points Nb14 shown in FIG. 7D have been removed by performing the multiple reflection noise removal processing. Measurement points are also excluded at steps within the measurement target object and a step between the measurement target object and the pallet bottom face. The sum of the distances Dis between the respective measurement points and Pbase does not greatly change even if some of the measurement points are excluded. As described above, for the pallet emptiness determination processing in which it is determined whether or not measurement points exist as a mass within the pallet, the influence is small even if measurement points near a step are removed as noise. Accordingly, it can be said that the multiple reflection noise removal processing is to be actively applied since a significant effect is obtained therefrom.

Next, model fitting processing using CAD data will be described. This processing is aimed for performing processing for fitting measurement points on a measurement target object to CAD data of the measurement target object, and understanding the position and posture of the measurement target object. As a result of accurately estimating the position and posture of the measurement target object, the accuracy of gripping the measurement target object using the robot is improved, and the measurement target object can be transferred to a downstream process using the robot at a high level.

Figure 8A:
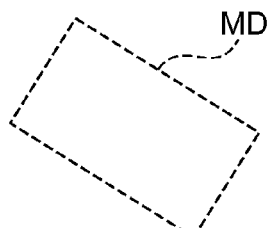
FIGS. 8A to 8F are diagrams illustrating CAD data model fitting processing.
Figure 8B:
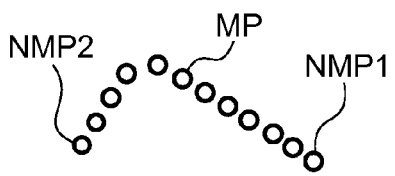
Figure 8C:
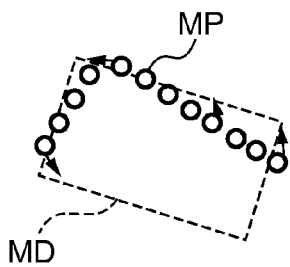
Figure 8D:
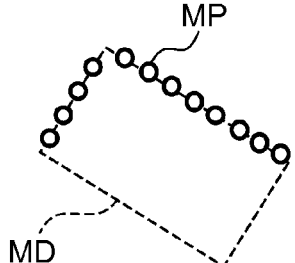

The model fitting processing using the CAD data will be described with reference to FIGS. 8A to 8F. FIG. 8A shows model data MD. For the sake of simplification of description, illustration is given two-dimensionally. The model data MD is rectangle. FIG. 8B shows measurement points MP on a measurement target object. At the initial stage of the fitting processing, the processing is started from a state where the measurement points MP on the measurement target object and the model data MD are roughly overlapped with each other, as shown in FIG. 8C. The position and posture of the model data MD are changed such that the error between the measurement points MP and points on the model data MD is smallest. As a method for changing the position and posture, a technique called an ICP (Iterative Closest Point) algorithm is known. In this case, since the measurement points are to be associated with the model data MD, an ICP algorithm called point-to-plane is used. The ICP algorithm is divided into two steps, namely (1) associating each measurement point with the closest point thereof on the model data MD, and (2) calculating posture conversion by which the error between the measurement points and the points on the model data MD is minimized. As a result of repeatedly performing these two steps, the error between the measurement points and the points on the model data MD gradually decreases, and when the error becomes smaller than a fixed value, the repeated processing is stopped to obtain a final result. With the point-to-plane algorithm, approximation to a small plane is performed using a measurement point of interest and peripheral points thereof. The measurement point of interest is associated with the closest point by obtaining the distance in the normal direction of a small plane between the measurement point of interest and the model data MD. An exemplary final result is shown in FIG. 8D.

Figure 8E:
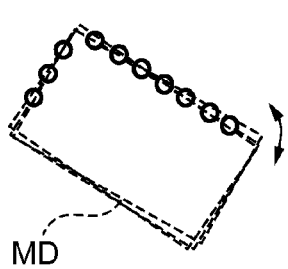

FIG. 8E is a diagram showing the case where measurement points at step portions have been removed by the multiple reflection noise removal processing. Measurement points corresponding to ends of the model are removed by the multiple reflection noise removal processing. Specifically, NMP1 and NMP2 in FIG. 8B correspond to the removed measurement points. In the case of the model fitting processing, in order to determine the posture of the model, it is desirable that there are measurement points in a wide area of the model as much as possible. In regard to this, there are cases where measurement points in a boundary area are also removed as noise as shown in FIG. 8E by the multiple reflection noise removal processing, and a decrease in the posture accuracy may possibly occur due to it. A decrease in the accuracy appears as a phenomenon in which a position shift is caused in a final result of the position and posture of the model data MD, for example.

Figure 8F:
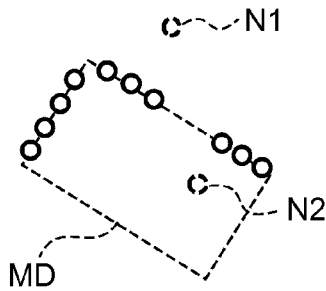

On the other hand, FIG. 8F is a diagram showing the case where multiple reflection noise points N1 and N2 exist on a component. With the ICP algorithm used in the model fitting processing, it is possible to remove outlier points using a robust estimation method in the course of performing processing using many points, and accordingly, removal of noise before this processing is not necessarily required.

Accordingly, it can be said that, regarding the input of the model fitting processing, a more desirable result is obtained by inputting measurement points to which the multiple reflection noise removal processing has not been applied.

Next, a description will be given, with reference to a flowchart in FIG. 9, of a processing procedure of a component gripping system including the information processing apparatus 1 and the robot 6 according to Embodiment 1.

In step S101, a projection/image capturing control unit 41 accepts a measurement instruction from the robot 6 and controls the projection unit 30, thereby performing pattern projection onto the measurement target object 5. As the projection patterns, the Gray code patterns described in FIG. 2 are used.

In step S102, the projection/image capturing control unit 41 controls the image capturing unit 20 to cause it to execute image capturing processing synchronously with the pattern projection. Upon the image capturing processing being performed, a pattern captured image D10 is stored in a memory (not shown). Processing in steps S101 and S102 is repeatedly executed for the number of projection patterns.

In step S103, the decoding unit 42 executes processing for decoding the Gray codes, based on a plurality of pattern captured images D10. A result of the decoding processing is stored as spatial code values D11 in a memory (not shown). In step S104, the distance measurement unit 43 executes distance measurement processing with respect to the measurement target object 5, based on the spatial code values D11. In step S105, the multiple reflection noise determination unit 44 executes multiple reflection noise determination processing, based on the measured distance values D12 that are measured in step S104. Here, noise-removed measured distance values D13 (correction values) obtained by removing the determined multiple reflection noise from the measured distance values are generated.

In step S106, the emptiness determination unit 121 executes the pallet emptiness determination processing based on the noise-removed measured distance values D13 (correction values).

In step S107, the emptiness determination unit 121 determines whether or not the pallet is empty. If it is determined that the pallet is empty, the processing proceeds to step S110. On the other hand, if it is determined that the pallet is not empty, the processing proceeds to step S108.

In step S108, the position/posture acquisition unit 122 performs the model fitting processing. The input data of the model fitting processing is the measured distance values acquired in step S104. As mentioned above, in the model fitting processing, the estimation accuracy is better when using a distance point group from which the multiple reflection noise has not been removed, and accordingly the measured distance values acquired in step S104 is used as the input. The result of the model fitting processing is position/posture information D14 of the measurement target object 5. The position is the XYZ coordinates in the camera coordinate system, the posture is information regarding the orientation of the measurement target object 5, and there are various expression methods thereof. For example, Euler angle expression, quaternion expression, rotational shaft-rotational angle expression, or the like can be used.

In step S109, the position/posture acquisition unit 122 notifies the robot 6 of the position/posture information D14 of the measurement target object 5. The robot 6 performs a gripping operation based on the position/posture information D14 of which the robot 6 has been notified.

In step S110, the information processing unit 12 executes pallet replenishment notification processing, and notifies the user that the pallet is empty. The notification methods include a method of visually displaying information on a display terminal (not shown) in the information processing apparatus 1, a method of giving sound notification using a sound output device (not shown), and the like. The processing flow in Embodiment 1 is as described above.

Thus, the distance point group to be used is switched between the distance point group from which multiple reflection noise has been removed and the distance point group from which it has not been removed, depending on the downstream processing, and both processing can thereby be appropriately executed.

Figure 9:
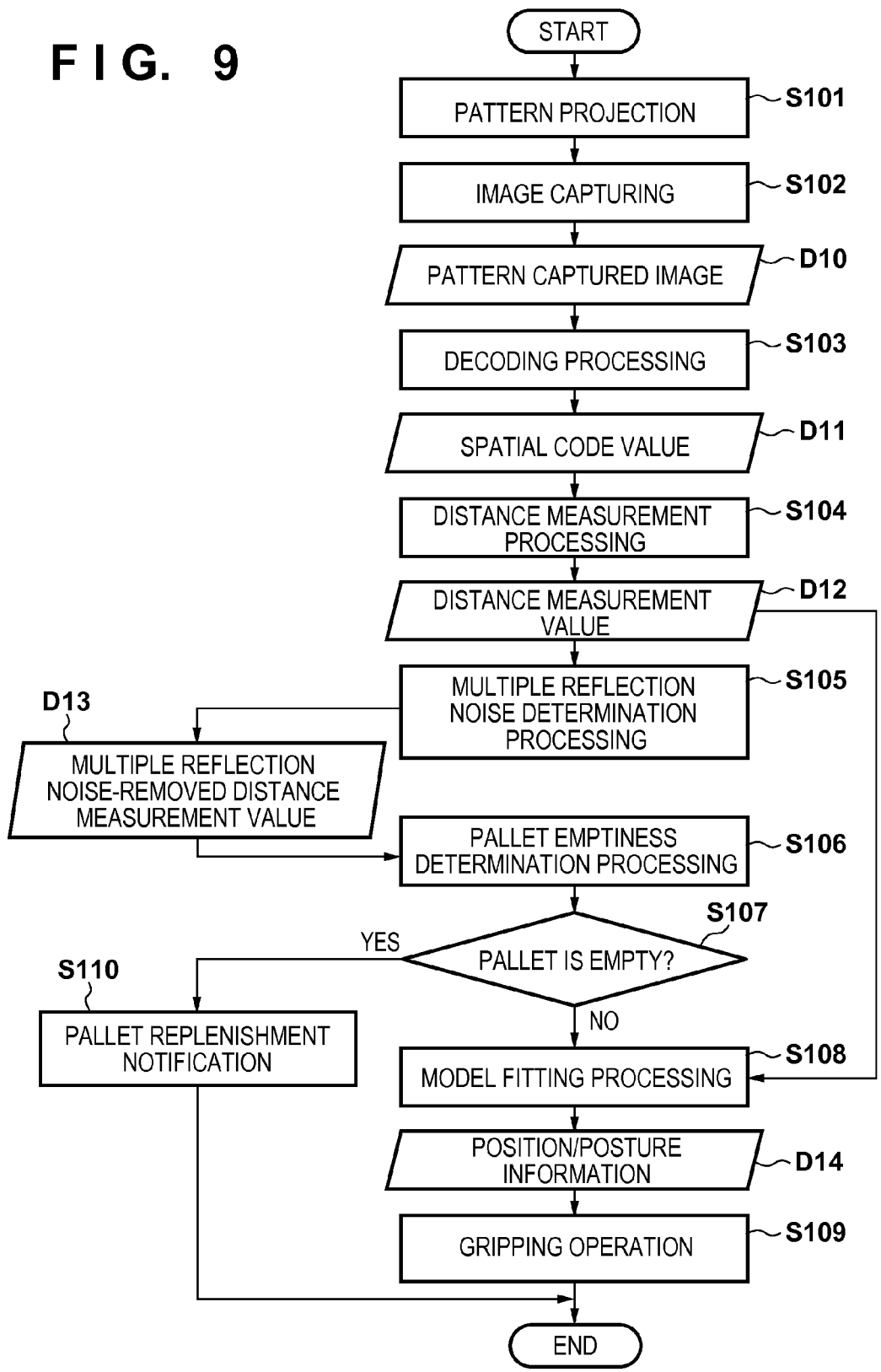
FIG. 9 is a diagram illustrating a processing flow in Embodiment 1.

Note that, in FIG. 9, an example of separately holding the measured distance values and the noise-removed measured distance values D13 (correction values) has been described. However, as a result of holding two types of measured distance values having almost the same size and a large information volume, the memory is excessively used. Then, a method using flag information, which contains binary values corresponding to the respective measured distance values, is also available. In the flag information, 1 is stored if a measured distance value is determined to be the multiple reflection noise in the multiple reflection noise determination processing, and 0 is stored if not. In the pallet emptiness determination processing, which is downstream processing, the values in the flag information are referenced, and only the information of a distance point whose flag is 0 is used in the processing. As a result of utilizing the flag information, the amount of the memory to be used can be further reduced than by doubly managing the distance information.

As described above, according to the present invention, the noise removal processing is performed for processing affected by the multiple reflection noise, and accordingly a decrease in the accuracy due to multiple reflection is reduced. On the other hand, the noise removal processing is not applied to processing affected by the loss of a distance point group near jump edges, which is a side effect of the noise removal processing, and it is thereby possible to prevent a decrease in the accuracy.

Therefore, it is possible to reduce both the influence of noise generated by multiple reflection and the influence of the side effect of the noise removal processing on information processing that uses the measured distance values.

Second Embodiment

The present embodiment will describe another example in which processing is switched between the case of performing downstream processing after removing multiple reflection noise from measured distance values and the case of performing downstream processing without removing multiple reflection noise from measured distance values, depending on the type of the downstream processing, thereby reducing both the influence of noise generated by multiple reflection and the influence of a side effect caused by noise removing processing. As types of the downstream processing, first processing in which noise is removed (processing for determining a state of interference between distance measurement points and a robot that grips a target object, the processing being susceptible to the influence of noise) and second processing in which noise is not removed (model fitting processing that is relatively not susceptible to the influence of noise) will be described.

An exemplary functional configuration of the information processing apparatus 1 according to Embodiment 2 is similar to that shown in the block diagram in FIG. 1 which is used in Embodiment 1. A difference between Embodiment 2 and Embodiment 1 lies in functional blocks included in the information processing unit 12. In Embodiment 1, the information processing unit 12 includes the emptiness determination unit 121 and the position/posture acquisition unit 122.

Figure 10:
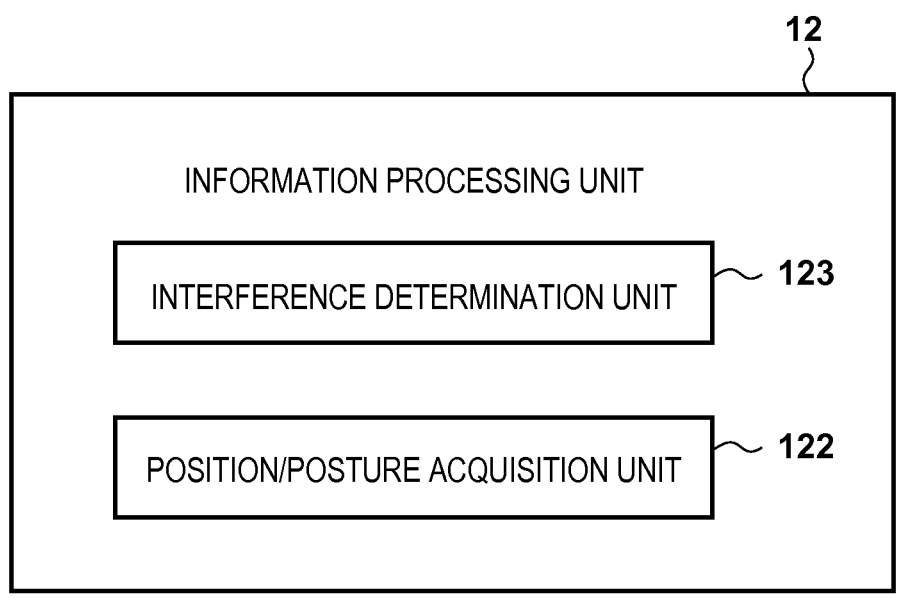
FIG. 10 is a schematic configuration diagram of an information processing unit according to Embodiment 2.

In contrast, in Embodiment 2, the information processing unit 12 includes an interference determination unit 123 in place of the emptiness determination unit 121, as shown in FIG. 10.

The interference determination unit 123 executes interference determination processing for determining whether or not a measurement target object 5 whose position and posture are estimated by the position/posture acquisition unit 122 can be gripped or held with a robot hand that the robot 6 has, without colliding with surrounding measurement target objects 5 or the pallet. More specifically, the interference determination unit 123 executes processing for determining interference between measurement points and the robot 6 that grips the measurement target object 5 based on a distance measurement result. If the measurement target object 5 cannot be gripped using a first candidate, the interference determination unit 123 gives the position/posture acquisition unit 122 a request to give another candidate.

As the robot hand, for example, a magnetic or absorbing hand that performs holding as a result of being pressed against a flat surface portion of a work may be used. A gripper hand may also be used that performs gripping by holding an object from the inside or the outside as a result of opening and closing a number of fingers, such as two fingers or three fingers. Any other end effectors that can be attached to the robot arm and has a gripping mechanism may be used. In the description of the present embodiment, a gripper robot hand will be used as shown in FIGS. 11A to 11F.

The details of the interference determination processing will now be described with reference to FIGS. 11A to 11F. In each drawing, a plurality of measurement target objects 5 are piled up in the pallet 51. It is assumed that the position and posture of a gripping candidate measurement target object 5g among the plurality of measurement target objects 5 have been estimated by the position/posture acquisition unit 122. The gripping candidate measurement target object 5g is to be gripped by a robot hand Rh of the robot 6. It is assumed that, at this time, shape data of the robot hand Rh are registered in advance in the interference determination unit 123. It is also assumed that gripping information regarding the portion of the gripping candidate measurement target object 5g to be gripped by the robot hand Rh and the direction from which the gripping candidate measurement target object 5g is to be gripped with the robot hand Rh is also registered in advance. By using the shape data of the robot hand Rh and the gripping information, if the position and posture of the gripping candidate measurement target object 5g are estimated, the positional relationship between the robot hand Rh and the gripping candidate measurement target object 5g is uniquely determined.

In the interference determination processing, the shape data of the robot hand Rh in a state of gripping the gripping candidate measurement target object 5g is arranged in measured distance value data. The shape data is handled after being converted into volume data. It is determined whether or not any measurement point other than the measurement points on the gripping candidate measurement target object 5g exists inside the volume data of the robot hand Rh. If a measurement point exists inside the volume data, it is determined that interference occurs. On the other hand, if a measurement point does not exist inside the volume data, it is determined that interference does not occur.

Figure 11A:
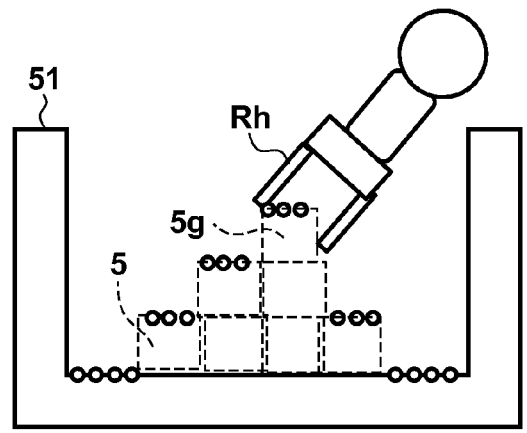
Figure 11B:
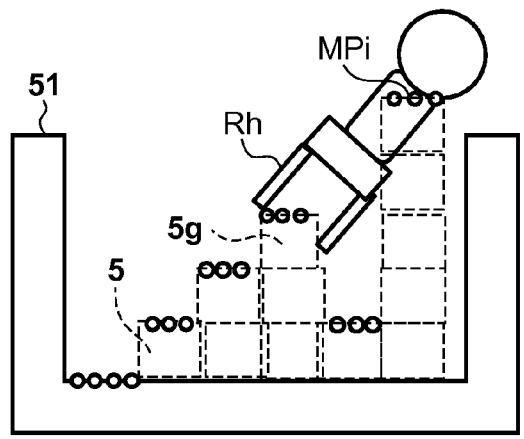

FIG. 11A shows the case where interference does not occur and multiple reflection noise does not exist. Since a measurement point does not exist inside the volume data of the robot hand Rh, it is correctly determined that interference does not occur. FIG. 11B shows the case where interference occurs and multiple reflection noise does not exist. Since a measurement point MPi exists inside the volume data of the robot hand Rh, it is correctly determined that interference occurs.

Figure 11C:
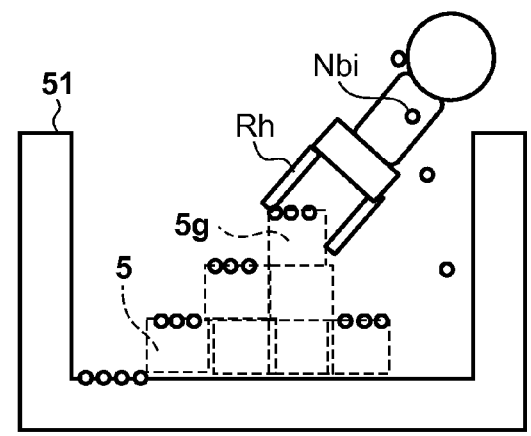

FIG. 11C shows the case where interference does not occur and multiple reflection noise exists. In reality, interference does not occur. However, since multiple reflection noise Nbi exists inside the volume data of the robot hand Rh, it is incorrectly determined that interference occurs. FIG. 11D shows the case where interference occurs and multiple reflection noise exists. In actuality, the measurement target object 5 is arranged at a position where multiple reflection noise is likely to occur, and accordingly multiple reflection noise is not observed. Since the measurement point MPi exists inside the volume data of the robot hand Rh, it is correctly determined that interference occurs.

FIG. 11E shows the case where interference does not occur and the multiple reflection noise removal processing has been performed. The multiple reflection noise generated in FIG. 11C has been removed by the multiple reflection noise removal processing. For this reason, a measurement point does not exist inside the volume data of the robot hand Rh, and accordingly it is correctly determined that interference does not occur. FIG. 11F shows the case where interference occurs and the multiple reflection noise removal processing has been performed. Measurement points at step portions among the measurement points in FIG. 11D have been removed. However, since the measurement points at the step portions are merely small portions and most measurement points remain, the measurement point Mpi exists inside the volume data of the robot hand Rh. Accordingly, it is correctly determined that interference occurs.

As described above, as a result of applying the multiple reflection noise removal processing in the interference determination processing, the cases of incorrectly determining that interference occurs can be excluded, and a high effect thereof is achieved.

Figure 12:
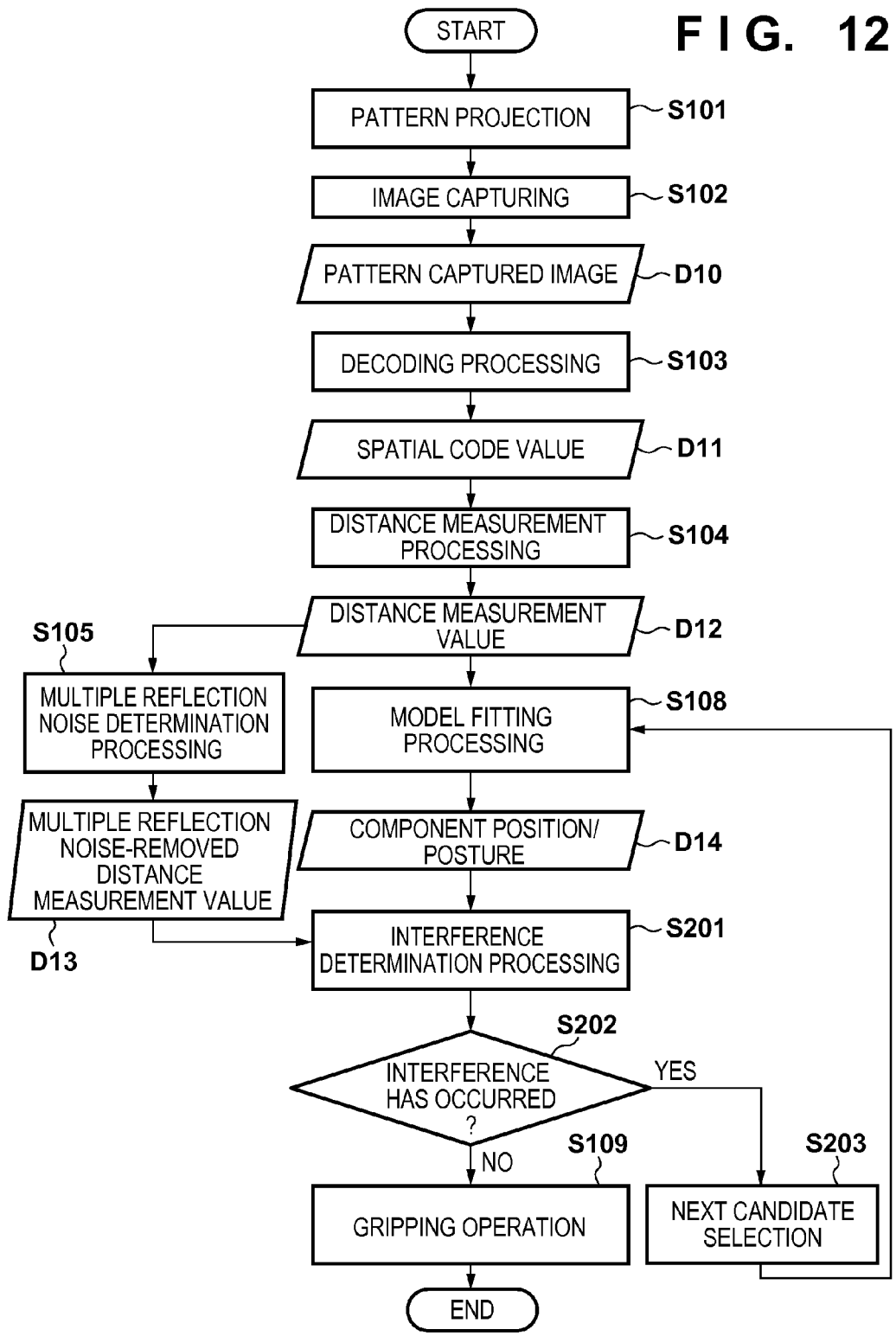
FIG. 12 is a diagram illustrating a processing flow in Embodiment 2.

Next, a description will be given, with reference to a flowchart in FIG. 12, of a processing procedure of a component gripping system including the information processing apparatus 1 and the robot 6 according to Embodiment 2. The content of the processing performed in steps that are given the same reference numerals as those in the processing in Embodiment 1 shown in FIG. 9 is the same as that in Embodiment 1, and accordingly a description thereof will be omitted.

In step S201, the interference determination unit 123 performs interference determination processing. In the interference determination processing, the noise-removed measured distance values D13 (correction values) generated in step S105 are input. As mentioned above, the interference determination can be correctly performed by using the measured distance values from which multiple reflection noise has been removed.

In step S202, the interference determination unit 123 determines whether or not interference occurs. If it is determined that the interference occurs, the processing proceeds to step S203. On the other hand, if it is determined that interference does not occur, the processing proceeds to step S109.

In step S203, the position/posture acquisition unit 122 performs next candidate selection processing. Specifically, since it is determined that interference occurs with the measurement target object 5 whose position and posture have been estimated by the model fitting processing, the next candidate is selected. Thereafter, the processing returns to step S108.

The processing flow in Embodiment 2 is as described above.

As described above, according to the present invention, the noise removal processing is performed for processing affected by the multiple reflection noise, and accordingly a decrease in the accuracy due to multiple reflection is reduced. On the other hand, the noise removal processing is not applied to processing affected by the loss of a distance point group near jump edges, which is a side effect of the noise removal processing, and it is thereby possible to prevent a decrease in the accuracy.

Modification

Note that, although omitted in the processing flow, if the next candidate does not exist in the next candidate selection processing in step S203, the user may be notified that a grippable candidate does not exist.

The user needs to take some measure, such as disturbing the state where the measurement target objects 5 are piled up, but after taking the measure, the automatic picking operation can be resumed.

The description has been given of an example of performing distance measurement with the two-dimensional pattern projection method using a projector that includes, as the projection unit 30, the display element and the projection optical system. However, the scope to which the present invention is applicable is not limited to the above. For example, the present invention is also applicable to a light-section method in which scanning is performed using one-dimensional line light to measure the distance to a measurement target object.

Although the model fitting processing using CAD data has been described as processing (second processing) that is performed by the information processing unit 12 and uses measurement points from which multiple reflection noise is not removed, the scope to which the present invention is applicable is not limited to this processing. Other application examples include function approximation processing on point group data, and model fitting processing using an actually-measured point group template.

Firstly, the function approximation processing on point group data will be described. The function for approximating the point group data will be described by taking a plane as an example. In the plane approximation processing, four parameters, namely a, b, c, and d in an equation $aX+bY+cZ+d=0$ of a plane are estimated based on measurement values $(X_i, Y_i, Z_i)$ (i=1 to N) of data of a point group, which includes N points. In general, simultaneous equations are set up based on the measured values on 1 to N points, and a least square solution of a, b, c, and d is obtained. At this time, a point at which the error from the approximate plane is large is excluded and an approximate plane is again obtained, and the influence of multiple reflection noise can thereby be reduced. Note that, although a plane is taken as an example in this description, the function to which the present invention can be effectively applied is not limited to a plane equation, and the present invention is also applicable to function approximation processing for a spherical equation $(X-a)^2+(Y-b)^2+(Z-c)^2=r^2$, for example. In the case of a spherical equation, the sphere center coordinates (a, b, c) and the radius r of the sphere are the parameters to be estimated.

Next, the model fitting processing using an actually-measured point group template will be described. The actually-measured point group template is prepared by three-dimensionally measuring the whole circumferences of a target object in advance and connecting them, for example. In the case of the model fitting processing using a point group template, the position and posture are calculated using an ICP algorithm for points on the point group template and measurement points used by the distance measurement device. In this case, an ICP algorithm called point-to-point is used. Specifically, in an associating process, a point on the point group template that is closest to each measurement point is obtained by search. Subsequently, position/posture conversion is obtained by which the distances between the measurement points and the respective closest points decrease. Results of repeatedly performing association and calculation of the position/posture conversion converge into a final result.

Similarly, although the pallet emptiness determination processing and the interference determination processing have been described as processing (first processing) that is performed by the information processing unit 12 and uses measurement points from which multiple reflection noise is removed, the scope to which the present invention is applicable is not limited to the above processing. Other application examples include shape acquisition from an unknown scene.

In shape acquisition from an unknown scene, a target object is three-dimensionally measured from various directions, and a three-dimensional point group of the whole circumferences thereof is obtained. By connecting results thereof, three-dimensional shape data of the whole target object is acquired. In such an example, acquisition of accurate three-dimensional shape data of a target object is required, and it is accordingly favorable to input measurement points from which multiple reflection noise has been removed.

In general, in determination processing using local data, a determination result greatly depends on whether or not a point exists, and it is accordingly favorable to use measurement points from which multiple reflection noise has been removed. In comparison, in determination processing using a wide range of data, statistic determination criteria such as robust estimation can be used since many points can be used, and it is accordingly favorable to use measurement points from which multiple reflection noise has not been removed.

Furthermore, although a method using the vector direction with respect to an adjacent measurement point has been described as the multiple reflection noise removal processing, the multiple reflection noise removal processing to which the present invention is applicable is not limited thereto. For example, the present invention is also applicable to multiple reflection noise removal processing using the increasing and decreasing direction of spatial codes, such as the processing described in Japanese Patent No. 3800842.

According to the present invention, it is possible to reduce both the influence of noise generated by multiple reflection and the influence of the side effect of the noise removal processing on information processing that uses the measured distance values.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-073733, filed Mar. 31, 2014, which is hereby incorporated by reference herein in its entirety.

What is claimed is:

1. An information processing apparatus comprising:
   an image acquisition unit configured to acquire a captured image of a target object onto which a pattern is projected;
   a distance acquisition unit configured to acquire, based on the image, a plurality of distance values, each indicating a distance to the target object;
   a determination unit configured to determine whether each of the acquired distance values is noise generated by multiple reflection of the pattern;
   a first processing unit configured to perform first processing, using distance values obtained by removing a distance value that is determined to be the noise from the plurality of distance values; and
   a second processing unit configured to perform second processing that is different from (a) processing of the determination unit and (b) the first processing, using the plurality of distance values that are acquired by the distance acquisition unit and from which the distance value determined to be the noise has not been removed,
   wherein the determination unit determines, based on a measured distance value at a first measurement point and a measured distance value at a second measurement point that is adjacent to the first measurement point, whether the measured distance value at the first measurement point is noise generated by the multiple reflection,
   wherein, if an inclination of a vector connecting the measured distance value at the first measurement point and the measured distance value at the second measurement point is larger than a threshold, the determination unit determines that the measured distance value at the first measurement point is noise generated by the multiple reflection, and
   wherein at least one processor and a memory are used to implement units comprising the determination unit, the first processing unit, and the second processing unit.

2. The information processing apparatus according to claim 1, wherein the first processing is processing for determining whether or not the target object exists.

3. The information processing apparatus according to claim 1, wherein the target object is stored in a state of being piled up in a container, and
wherein the first processing is processing for determining whether or not the target object exists in the container.

4. The information processing apparatus according to claim 3, further comprising a notification unit configured to notify a user that the target object does not exist, if it is determined by the first processing unit that the target object does not exist.

5. The information processing apparatus according to claim 1, wherein the first processing is processing for determining whether interference occurs between a measurement point and a robot for gripping or holding the target object based on a result of measurement performed by the distance acquisition unit.

6. The information processing apparatus according to claim 1, wherein the second processing is processing for fitting a measurement point on the target object to model information of the target object.

7. The information processing apparatus according to claim 1, wherein the first processing is processing that is more affected by noise than the second processing is.

8. The information processing apparatus according to claim 1, wherein the first processing is processing using a more local measurement point than in the second processing.

9. The information processing apparatus according to claim 1, further comprising:
a projection unit configured to project a pattern onto the target object; and
an image capturing unit configured to capture an image of the target object onto which the pattern is projected.

10. The information processing apparatus according to claim 1, wherein the pattern is a stripe pattern having a bright portion and a dark portion.

11. A gripping system comprising:
the information processing apparatus according to claim 1; and
a unit configured to hold or grip the target object.

12. A method for controlling an information processing apparatus, the method comprising:
an image acquisition step of acquiring a captured image of a target object onto which a pattern is projected;
a distance acquisition step of acquiring, based on the image, a plurality of distance values, each indicating a distance to the target object;
a determination step of determining whether each of the acquired distance values is noise generated by multiple reflection of the pattern;
a first processing step of performing first processing, using distance values obtained by removing a distance value that is determined to be the noise from the plurality of distance values; and
a second processing step of performing second processing that is different from (a) processing of the determination step and (b) the first processing, using the plurality of distance values that are acquired by the distance acquisition step and from which the distance value determined to be the noise has not been removed,
wherein the determination step determines, based on a measured distance value at a first measurement point and a measured distance value at a second measurement point that is adjacent to the first measurement point, whether the measured distance value at the first measurement point is noise generated by the multiple reflection,
wherein, if an inclination of a vector connecting the measured distance value at the first measurement point and the measured distance value at the second measurement point is larger than a threshold, the determination step determines that the measured distance value at the first measurement point is noise generated by the multiple reflection.

13. A non-transitory computer-readable storage medium storing a computer program for causing a computer to execute the steps of a method for controlling an information processing apparatus, the method comprising:
an image acquisition step of acquiring a captured image of a target object onto which a pattern is projected;
a distance acquisition step of acquiring, based on the image, a plurality of distance values, each indicating a distance to the target object;
a determination step of determining whether each of the acquired distance values is noise generated by multiple reflection of the pattern;
a first processing step of performing first processing, using distance values obtained by removing a distance value that is determined to be the noise from the plurality of distance values; and
a second processing step of performing second processing that is different from (a) processing of the determination step and (b) the first processing, using the plurality of distance values that are acquired by the distance acquisition step and from which the distance value determined to be the noise has not been removed,
wherein the determination step determines, based on a measured distance value at a first measurement point and a measured distance value at a second measurement point that is adjacent to the first measurement point, whether the measured distance value at the first measurement point is noise generated by the multiple reflection,
wherein, if an inclination of a vector connecting the measured distance value at the first measurement point and the measured distance value at the second measurement point is larger than a threshold, the determination step determines that the measured distance value at the first measurement point is noise generated by the multiple reflection.

14. An information processing apparatus comprising:
an image acquisition unit configured to acquire a captured image of a target object onto which a pattern is projected;
a distance acquisition unit configured to acquire, based on the image, a plurality of distance values, each indicating a distance to the target object;
a determination unit configured to determine whether each of the acquired distance values is noise generated by multiple reflection of the pattern;
a first processing unit configured to perform first processing, using distance values obtained by removing a distance value that is determined to be the noise from the plurality of distance values; and
a second processing unit configured to perform second processing that is different from (a) processing of the determination unit and (b) the first processing, using the plurality of distance values that are acquired by the distance acquisition unit and from which the distance value determined to be the noise has not been removed, wherein the target object is stored in a state of being piled up in a container, wherein the first processing is processing for determining whether or not the target object exists in the container, wherein the apparatus further comprises a notification unit configured to notify a user that the target object does not exist, if it is determined by the first processing unit that the target object does not exist, and wherein at least one processor and a memory are used to implement units comprising the determination unit, the first processing unit, and the second processing unit.

15. A method for controlling an information processing apparatus, the method comprising:

an image acquisition step of acquiring a captured image of a target object onto which a pattern is projected;

a distance acquisition step of acquiring, based on the image, a plurality of distance values, each indicating a distance to the target object;

a determination step of determining whether each of the acquired distance values is noise generated by multiple reflection of the pattern;

a first processing step of performing first processing, using distance values obtained by removing a distance value that is determined to be the noise from the plurality of distance values; and a second processing step of performing second processing that is different from (a) processing of the determination step and (b) the first processing, using the plurality of distance values that are acquired by the distance acquisition step and from which the distance value determined to be the noise has not been removed, wherein the target object is stored in a state of being piled up in a container, wherein the first processing is processing for determining whether or not the target object exists in the container, wherein the method further comprises a notifying step of notifying a user that the target object does not exist, if it is determined by the first processing that the target object does not exist.

16. A non-transitory computer-readable storage medium storing a computer program for causing a computer to execute the steps of a method for controlling an information processing apparatus, the method comprising:

an image acquisition step of acquiring a captured image of a target object onto which a pattern is projected;

a distance acquisition step of acquiring, based on the image, a plurality of distance values, each indicating a distance to the target object;

a determination step of determining whether each of the acquired distance values is noise generated by multiple reflection of the pattern;

a first processing step of performing first processing, using distance values obtained by removing a distance value that is determined to be the noise from the plurality of distance values; and a second processing step of performing second processing that is different from (a) processing of the determination step and (b) the first processing, using the plurality of distance values that are acquired by the distance acquisition step and from which the distance value determined to be the noise has not been removed, wherein the target object is stored in a state of being piled up in a container, wherein the first processing is processing for determining whether or not the target object exists in the container, wherein the method further comprises a notifying step of notifying a user that the target object does not exist, if it is determined by the first processing that the target object does not exist.

17. An information processing apparatus comprising:

a distance measurement unit configured to acquire a plurality of distance measurement values, each indicating a distance to a measurement point in a region, by capturing the region onto which pattern light is projected;

a noise determination unit configured to determine whether or not each of the acquired distance measurement values is noise generated by multiple reflection of the pattern light;

a first processing unit configured to perform first processing that is processing for determining whether or not a target object exists based on an existence or absence of a measurement point, using data representing distance measurement values obtained by removing a distance measurement value that is determined to be the noise from the plurality of distance measurement values acquired by the distance measurement unit; and a second processing unit configured to perform second processing that is fitting processing between measurement points of the target object and model information of the target object, using the plurality of distance measurement values acquired by the distance measurement unit.

18. The information processing apparatus according to claim 17, wherein the noise determination unit determines, based on a distance measurement value at a first measurement point and a measurement distance value at a second measurement point that is adjacent to the first measurement point, whether or not the distance measurement value at the first measurement point is noise generated by the multiple reflection.

19. The information processing apparatus according to claim 18, wherein, if an inclination of a vector connecting the distance measurement value at the first measurement point and the distance measurement value at the second measurement point is larger than a threshold, the noise determination unit determines that the distance measurement value at the first measurement point is noise generated by the multiple reflection.

20. The information processing apparatus according to claim 17, wherein the first processing is processing that is more affected by noise than the second processing is.

21. The information processing apparatus according to claim 17, wherein the first processing is processing using a more local measurement point than in the second processing.

22. The information processing apparatus according to claim 17, further comprising:

a projection unit configured to project pattern light onto the target object; and an image capturing unit configured to capture an image of the target object onto which the pattern light is projected.

23. A gripping system comprising:

the information processing apparatus according to claim 17; and a unit configured to hold or grip the target object.

24. An information processing apparatus comprising:

a distance measurement unit configured to acquire a plurality of distance measurement values, each indicating a distance to a measurement point in a region, by capturing the region onto which pattern light is projected;
a noise determination unit configured to determine whether or not each of the acquired distance measurement values is noise generated by multiple reflection of the pattern light;
a first processing unit configured to perform first processing that is processing for determining whether interference occurs between a measurement point and a robot for gripping or holding a target object based on a result of measurement performed by the distance measurement unit, using data representing distance measurement values obtained by removing a distance measurement value that is determined to be the noise from the plurality of distance measurement values acquired by the distance measurement unit; and
a second processing unit configured to perform second processing that is fitting processing between measurement points of the target object and model information of the target object, using the plurality of distance measurement values acquired by the distance measurement unit.

25. A method for controlling an information processing apparatus, the method comprising:
acquiring a plurality of distance measurement values, each indicating a distance to a measurement point in a region, by capturing the region onto which pattern light is projected;
determining whether or not each of the acquired distance measurement values is noise generated by multiple reflection of the pattern light;
performing first processing that is processing for determining whether or not a target object exists based on an existence or absence of a measurement point, using data representing distance measurement values obtained by removing a distance measurement value that is determined to be the noise from the plurality of acquired distance measurement values; and
performing second processing that is fitting processing between measurement points of the target object and model information of the target object, using the plurality of acquired distance measurement values.

26. A method for controlling an information processing apparatus, the method comprising:
acquiring a plurality of distance measurement values, each indicating a distance to a measurement point in a region, by capturing the region onto which pattern light is projected;
determining whether or not each of the acquired distance measurement values is noise generated by multiple reflection of the pattern light;
performing first processing that is processing for determining whether interference occurs between a measurement point and a robot for gripping or holding a target object based on a result of measurement performed in the acquiring, using data representing distance measurement values obtained by removing a distance measurement value that is determined to be the noise from the plurality of acquired distance measurement values; and
performing second processing that is fitting processing between measurement points of the target object and model information of the target object, using the plurality of acquired distance measurement values.

27. A non-transitory computer-readable storage medium storing a computer program for causing a computer to execute a method for controlling an information processing apparatus, the method comprising:
acquiring a plurality of distance measurement values, each indicating a distance to a measurement point in a region, by capturing the region onto which pattern light is projected;
determining whether or not each of the acquired distance measurement values is noise generated by multiple reflection of the pattern light;
performing first processing that is processing for determining whether or not a target object exists based on an existence or absence of a measurement point, using data representing distance measurement values obtained by removing a distance measurement value that is determined to be the noise from the plurality of acquired distance measurement values; and
performing second processing that is fitting processing between measurement points of the target object and model information of the target object, using the plurality of acquired distance measurement values.

28. A non-transitory computer-readable storage medium storing a computer program for causing a computer to execute a method for controlling an information processing apparatus, the method comprising:
acquiring a plurality of distance measurement values, each indicating a distance to a measurement point in a region, by capturing the region onto which pattern light is projected;
determining whether or not each of the acquired distance measurement values is noise generated by multiple reflection of the pattern light;
performing first processing that is processing for determining whether interference occurs between a measurement point and a robot for gripping or holding a target object based on a result of measurement performed in the acquiring, using data representing distance measurement values obtained by removing a distance measurement value that is determined to be the noise from the plurality of acquired distance measurement values; and
performing second processing that is fitting processing between measurement points of the target object and model information of the target object, using the plurality of acquired distance measurement values.

* * * * *